(12) United States Patent
Kim et al.

(10) Patent No.: US 11,178,731 B2
(45) Date of Patent: Nov. 16, 2021

(54) INDUCTION HEATING DEVICE HAVING IMPROVED WORKING COIL FIXING STRUCTURE

(71) Applicant: LG Electronics Inc., Seoul (KR)

(72) Inventors: Seongjun Kim, Seoul (KR); Seongho Son, Seoul (KR); Jaekyung Yang, Seoul (KR); Yongsoo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 332 days.

(21) Appl. No.: 16/198,168

(22) Filed: Nov. 21, 2018

(65) Prior Publication Data

US 2019/0306929 A1 Oct. 3, 2019

(30) Foreign Application Priority Data

Mar. 27, 2018 (KR) .................. 10-2018-0035259

(51) Int. Cl.
*H05B 6/12* (2006.01)
*H05B 6/10* (2006.01)
*H05B 6/36* (2006.01)

(52) U.S. Cl.
CPC .............. *H05B 6/10* (2013.01); *H05B 6/1254* (2013.01); *H05B 6/362* (2013.01); *H05B 2206/022* (2013.01)

(58) Field of Classification Search
CPC ........ H05B 6/1254; H05B 6/362; H05B 6/10; H05B 2206/022; Y02B 40/00
USPC ....... 219/676, 618, 635, 622, 626, 619, 673, 219/674, 200, 506, 770, 777, 469; 336/60, 205, 223, 232
See application file for complete search history.

(56) References Cited

U.S. PATENT DOCUMENTS

| 2010/0282737 | A1* | 11/2010 | Acero Acero ....... H05B 6/1254 219/600 |
| 2013/0220997 | A1 | 8/2013 | Fossati et al. |
| 2016/0255682 | A1 | 9/2016 | Fossati et al. |

FOREIGN PATENT DOCUMENTS

| EP | 2236006 A1 | 10/2010 |
| EP | 2632230 | 8/2013 |
| JP | 2007157614 | 6/2007 |
| JP | 2012149195 | 8/2012 |
| KR | 2019940002889 | 4/1994 |
| KR | 1020020048765 | 6/2002 |
| KR | 1020180026141 | 3/2018 |

(Continued)

OTHER PUBLICATIONS

Translation of WO 2009/089980A1, Jul. 23, 2009, Proquest (Year: 2009).*

(Continued)

*Primary Examiner* — Quang T Van (74) *Attorney, Agent, or Firm* — Fish & Richardson P.C.

(57) ABSTRACT

An induction heating device includes: a working coil that includes an annularly-coiled conductive wire and that defines an annular coil hole at a central region of the working coil; a ferrite core that is located vertically below the working coil and that defines a core hole at a central region of the ferrite core corresponding to the annular coil hole; and an indicator board support that is located vertically below the ferrite core. The indicator board support includes a hook that extends to the core hole in a vertical direction and that is configured to insert into the core hole.

18 Claims, 6 Drawing Sheets

(56) References Cited

FOREIGN PATENT DOCUMENTS

WO     WO2009089980     7/2009
WO     WO2009090108     7/2009

OTHER PUBLICATIONS

Extended European Search Report in European Application No. 19162750.4, dated Jul. 26, 2019, 8 pages.

* cited by examiner

FIG. 1

RELATED ART

FIG. 2

RELATED ART

FIG. 3

RELATED ART

INDUCTION HEATING DEVICE HAVING IMPROVED WORKING COIL FIXING STRUCTURE

CROSS-REFERENCE TO RELATED APPLICATIONS

This application claims the priority of Korean Patent Application No. 10-2018-0035259, filed on Mar. 27, 2018, in the Korean Intellectual Property Office, the disclosure of which is hereby incorporated by reference in its entirety.

FIELD

The present disclosure relates to an induction heating device having an improved working coil fixing structure.

BACKGROUND

Cooking devices may use various heating methods to heat food. For example, gas ranges use gas as fuel. In some examples, cooking devices may heat a loaded object such as a cooking vessel or a pot using electricity.

Various methods of heating a loaded object using electricity may be divided into a resistive heating type and an inductive heating type. In the electrical resistive heating method, heat may be generated based on current flowing through a metal resistance wire or a non-metallic heating element such as silicon carbide. In this method, heat may be transmitted to the loaded object through radiation or conduction to heat the loaded object. In the inductive heating method, an eddy current may be generated in the loaded object made of metal based on a high-frequency power of a predetermined magnitude applied to a working coil. In this method, the loaded object may be heated by the eddy current generated based on magnetic field around the working coil.

For example, the induction heating method may be performed as follows. When power is applied to the induction heating device, a high-frequency voltage of a predetermined magnitude is applied to the working coil. As a result, an inductive magnetic field is generated around the working coil disposed in the induction heating device. When the flux of the inductive magnetic field passes through a bottom of the loaded object containing the metal loaded on the induction heating device, an eddy current is generated inside of the bottom of the loaded object. When the resulting eddy current flows in the bottom of the loaded object, the loaded object itself is heated.

The induction heating device has each working coil in each corresponding heating region to heat each of a plurality of loaded-objects (e.g., a cooking vessel).

In some cases, an induction heating device may include a plurality of working coils, each working coil corresponding to a heating region to heat one of a plurality of loaded-objects (e.g., a cooking vessel).

In some cases, an induction heating device may heat a single object using a plurality of working coils simultaneously. This device may be referred to as a zone-free based induction heating device.

In some cases, a zone-free based induction heating device may heat the loaded-object inductively in a heating zone corresponding to a plurality of working coils, regardless of a size and loaded position of the loaded-object.

Figure 1:
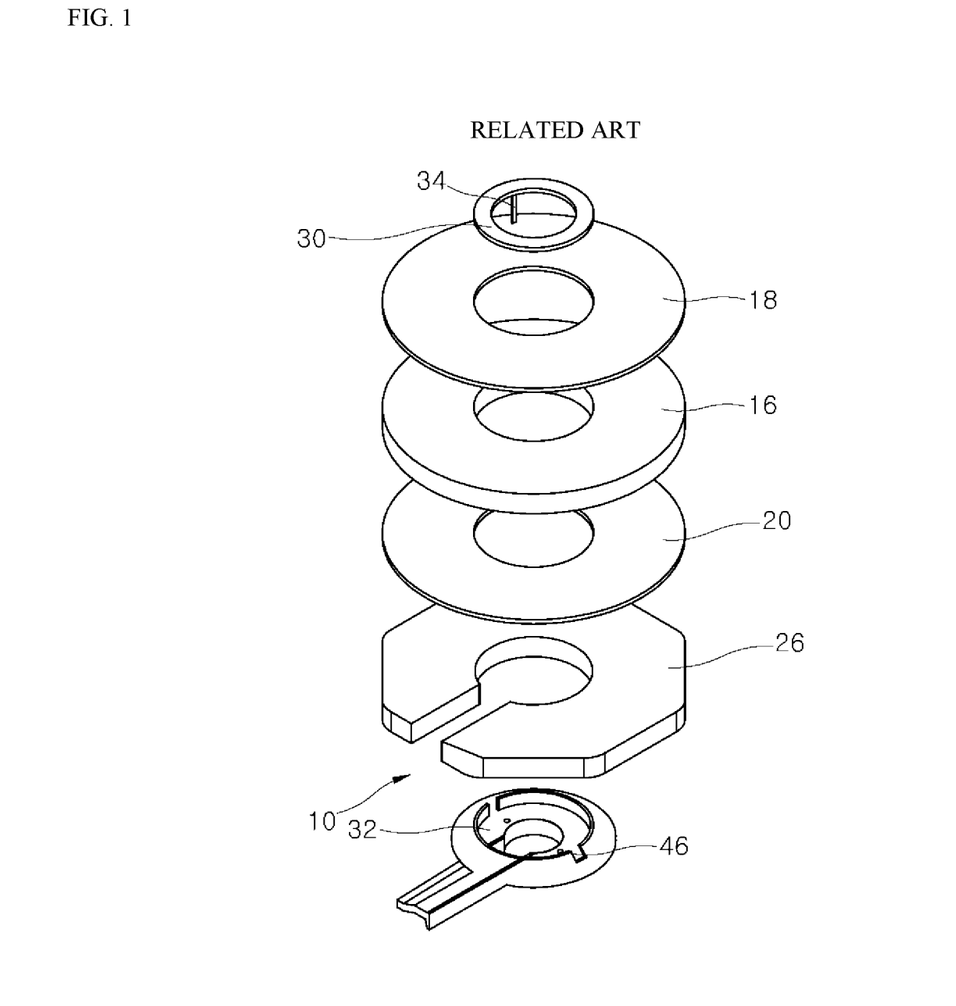
FIG. 1 is an exploded perspective view illustrating a working coil assembly of an induction heating device in related art.
Figure 2:
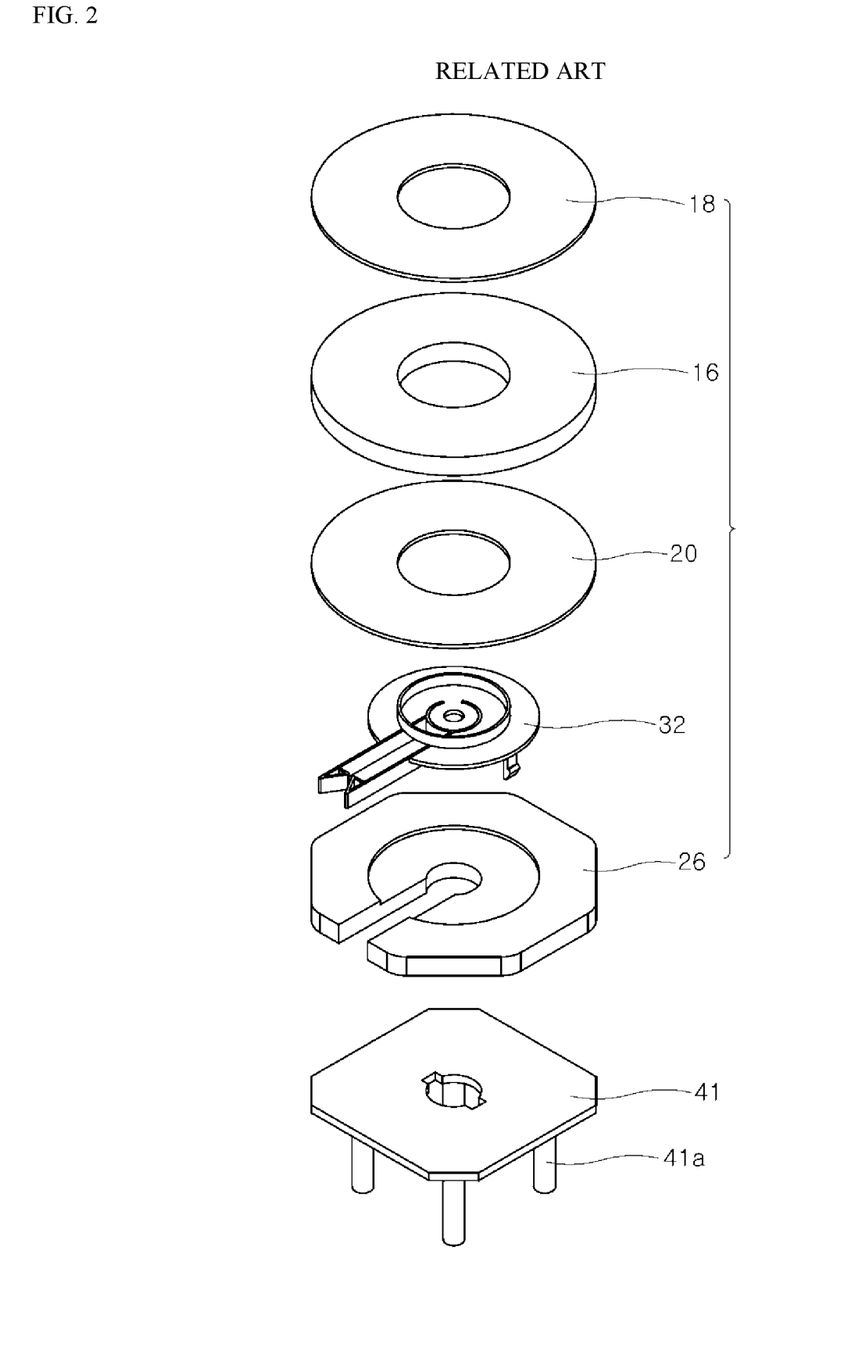
FIG. 2 shows an exploded perspective view of the working coil assembly of FIG. 1 including additional components.
Figure 3:
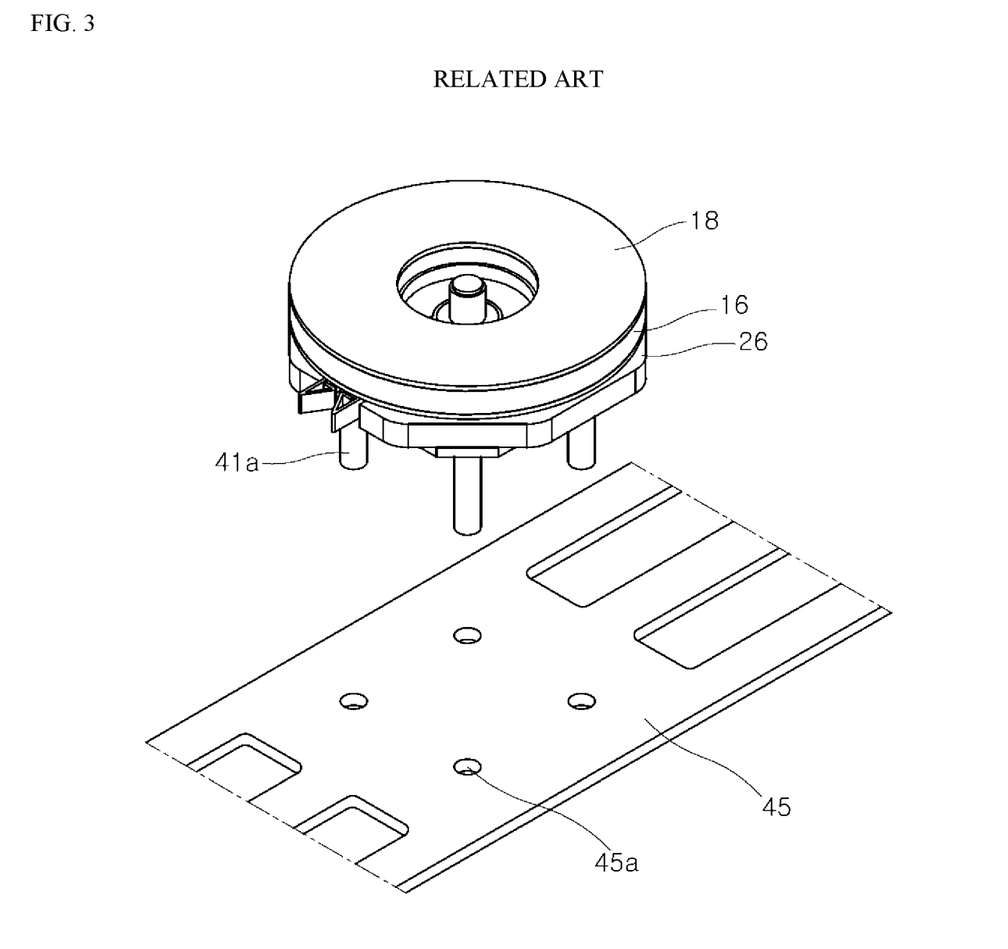
FIG. 3 is a schematic diagram illustrating an example coupling relationship between the working coil assembly and an example base plate of FIG. 2.

In some cases, an induction heating device may include a working coil assembly. FIG. 1 is an exploded perspective view illustrating an example working coil assembly in related art. FIG. 2 shows an exploded perspective view of the working coil assembly of FIG. 1 with some components being added and removed thereto and therefrom. FIG. 3 is a schematic diagram illustrating an example coupling relationship between the working coil assembly and an example base plate of FIG. 2.

Referring to FIG. 1, a working coil assembly 10 provided in an induction heating device includes a working coil 16, a mica sheet 18, a ferrite core 26, a first coil-fixing component 30, and a second coil-fixing component 32.

In this example, the working coil 16 may generate an AC magnetic field. The ferrite core 26 may diffuse the AC magnetic field as generated from the working coil 16. The mica sheets 18 and 20 prevent the heat generated from the working coil 16 from being directly transferred to the ferrite core 26. The first and second coil-fixing components 30 and 32 fix the working coil 16, the mica sheet 18, 20, and the ferrite core 26 via mutual coupling (coupling between a locking component 34 and a hole 46).

In some cases, the working coil assembly 10 may be a bonding type in which the mica sheet 18, 20, the working coil 16, and the ferrite core 26 may be bonded together by a sealant.

FIG. 2 and FIG. 3 illustrates an example third coil-fixing component 41 for coupling the working coil assembly 10 to the base plate 45.

For example, in the induction heating device, the working coil assembly 10 may be fixed to the base plate 45 via coupling between protrusions 41a of the third coil-fixing component 41 coupled to the bottom of the working coil assembly 10 and holes 45a in the base plate 45.

The induction heating device described above includes the first to third coil-fixing components 30, 32 and 41 that are additionally provided to fix and join the working coil assembly 10 to the base plate 45.

If at least one of the first through third coil-fixing components 30, 32, 41 fail, it may be difficult to separate the working coil 16 and the ferrite core 26 which are bonded by the sealant.

In some cases, in the process of separating the working coil 16 from the ferrite core 26, there is a risk that a wire of the working coil 16 may be uncoiled or that the ferrite core 26 may be broken.

In some cases where the working coil fixing structure is applied to the zone-free based induction heating device having a plurality of working coils, the increase in the number of components may lead to an increase in a manufacturing cost due to an increase in a material cost and an increase in an assembly time or manufacturing time.

SUMMARY

One purpose of the present disclosure is to provide an induction heating device in which a working coil is fixed to a base plate without a separate coil-fixing component.

Another purpose of the present disclosure is to provide an induction heating device that facilitates replacement of components of a working coil fixing structure.

The purposes of the present disclosure are not limited to the above-mentioned purposes. Other purposes and advantages of the present disclosure, as not mentioned above, may be understood from the following descriptions and more clearly understood from the implementations of the present disclosure. In some implementations, it will be readily appreciated that the objects and advantages of the present disclosure may be realized by features and combinations thereof as disclosed in the claims.

According to one aspect of the subject matter described in this application, an induction heating device includes: a working coil that includes an annularly-coiled conductive wire and that defines an annular coil hole at a central region of the working coil; a ferrite core that is located vertically below the working coil and that defines a core hole at a central region of the ferrite core corresponding to the annular coil hole; and an indicator board support that is located vertically below the ferrite core. The indicator board support includes a hook that extends to the core hole in a vertical direction and that is configured to insert into the core hole.

Implementations according to this aspect may include one or more of the following features. For example, the ferrite core may further define a coupling groove that extends outward in a radial direction from a circumferential surface that defines the core hole, where the hook is configured to insert into and couple to the coupling groove. In some examples, a diameter of the core hole is less than or equal to a diameter of the annular coil hole.

In some implementations, the induction heating device may further include a first mica sheet located between the working coil and the ferrite core, where the first mica sheet defines a first sheet hole at a central region of the first mica sheet corresponding to the annular coil hole. The first mica sheet may be configured to be coupled to the working coil and to the ferrite core by a sealant. In some examples, a diameter of the core hole is less than or equal to a diameter of the first sheet hole, and the diameter of the first sheet hole is less than or equal to a diameter of the annular coil hole.

In some implementations, the induction heating device may further include a second mica sheet configured to be coupled to a top surface of the working coil by a sealant, where the second mica sheet defines a second sheet hole at a central region of the second mica sheet corresponding to the annular coil hole. In some examples, a diameter of the first sheet hole is equal to a diameter of the second sheet hole. In some implementations, the induction heating device may further include: a base plate that is located between the ferrite core and the indicator board support, that is configured to support the working coil, and that defines a plate hole at a position corresponding to the annular coil hole; and an indicator board that is located between the indicator board support and the base plate and that defines a board hole corresponding to the annular coil hole.

In some examples, the hook is configured to vertically pass through the board hole and through the plate hole to couple to the core hole. In some examples, the base plate is made of aluminum (Al). In some examples, the induction heating device may further include a plurality of light-emitting elements located on the indicator board.

In some implementations, a distal end of the hook is configured to be positioned vertically below a top surface of the working coil based on the hook being coupled to the coupling groove, where a portion of the hook is configured to protrude toward an annular inner surface of the working coil that defines the annular coil hole based on the hook being coupled to the coupling groove. In some examples, the core hole is configured to be coaxial with the annular coil hole based on the hook being coupled to the coupling groove. In some examples, the first sheet hole is configured to be coaxial with the annular coil hole based on the first mica sheet being coupled to the working coil.

According to another aspect, an induction heating device includes: a casing; a cover plate that is located at a top of the casing and that is configured to seat one or more objects; a plurality of working coils that are located vertically below the cover plate and that are configured to heat the one or more objects on the cover plate, each working coil including an annularly-coiled conductive wire and defining an annular coil hole at a central region of a respective working coil; a plurality of ferrite cores, each of which is located vertically below a respective one of the plurality of working coils and defines a core hole at a central region of a respective ferrite core corresponding to the annular coil hole of the respective one of the plurality of working coils; and an indicator board support that is located vertically below the plurality of ferrite cores. The indicator board support includes a plurality of hooks that each extend to the core hole of a respective one of the plurality of ferrite cores and that are configured to insert into the core hole of the respective one of the plurality of ferrite cores.

Implementations according to this aspect may include one or more of the following features. For example, the plurality of working coils may be arranged horizontally below the cover plate, and have a same thickness with respect to a top surface of each ferrite core. In some implementations, the induction heating device may further include: a base plate that is located between the indicator board support and the plurality of ferrite cores and that is configured to support the plurality of working coils, the base plate defining a plurality of plate holes, each of which is defined at a position corresponding to the annular coil hole of the respective working coil; and an indicator board located between the indicator board support and the base plate. The indicator board may define a plurality of board holes, each of which is defined at a position corresponding to the annular coil hole of one of the plurality of working coils.

In some implementations, each ferrite core further defines a coupling groove that extends outward in a radial direction from a circumferential surface that defines the core hole of the respective ferrite core, where each hook is configured to insert into and couple to the coupling groove of the respective ferrite core. In some examples, each core hole is configured to be coaxial with the annular coil hole of the respective working coil based on each hook being coupled to the coupling groove of the respective ferrite core.

Further specific effects of the present disclosure as well as the effects as described above will be described with illustrations of specific details for carrying out the disclosure.

BRIEF DESCRIPTION OF DRAWINGS

Throughout the drawings, like reference numerals refer to like elements.

DETAILED DESCRIPTION

Hereinafter, an induction heating device according to one or more implementations of the present disclosure is illustrated.

Figure 4:
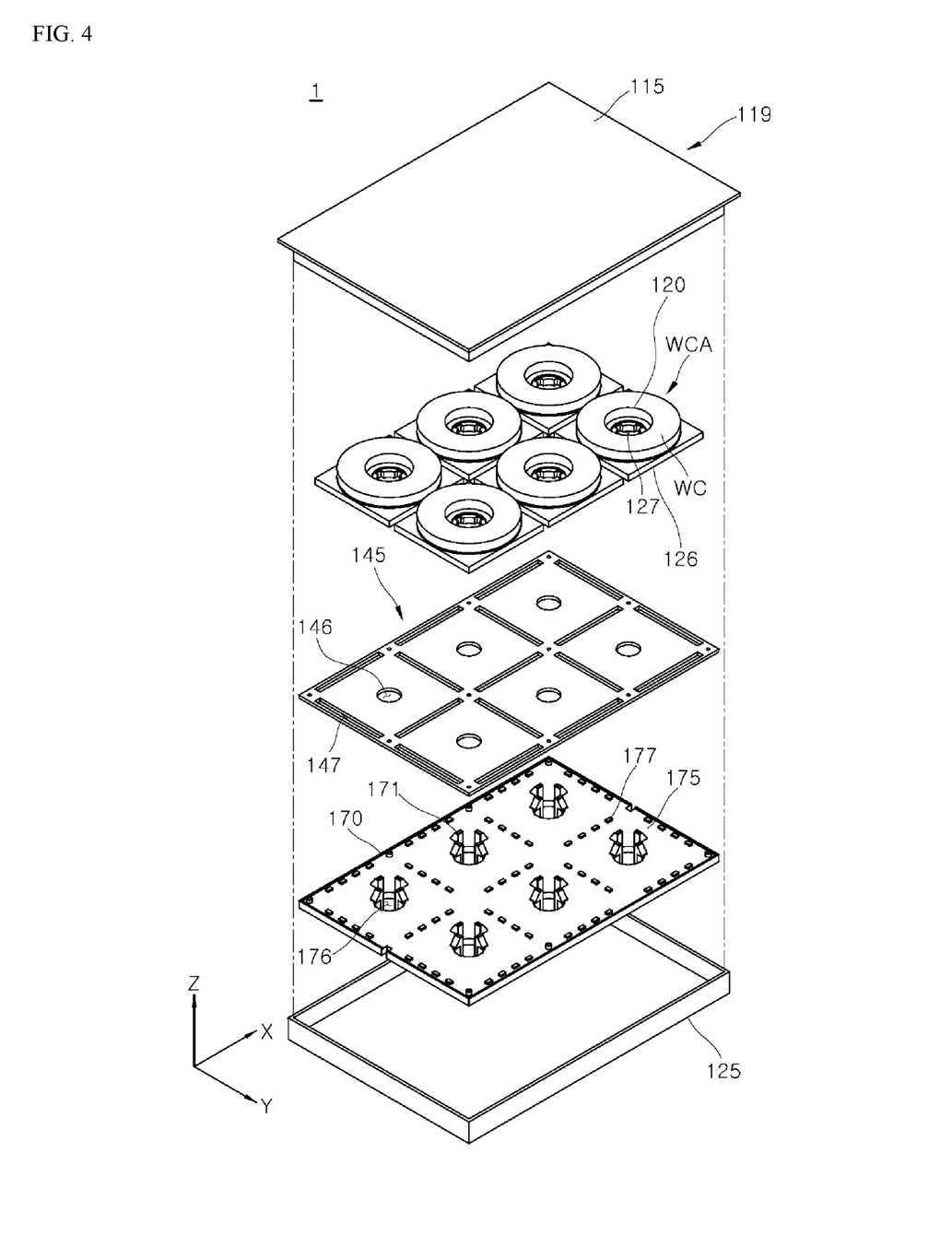
FIG. 4 is a schematic diagram illustrating an induction heating device according to one implementation of the present disclosure.
Figure 5:
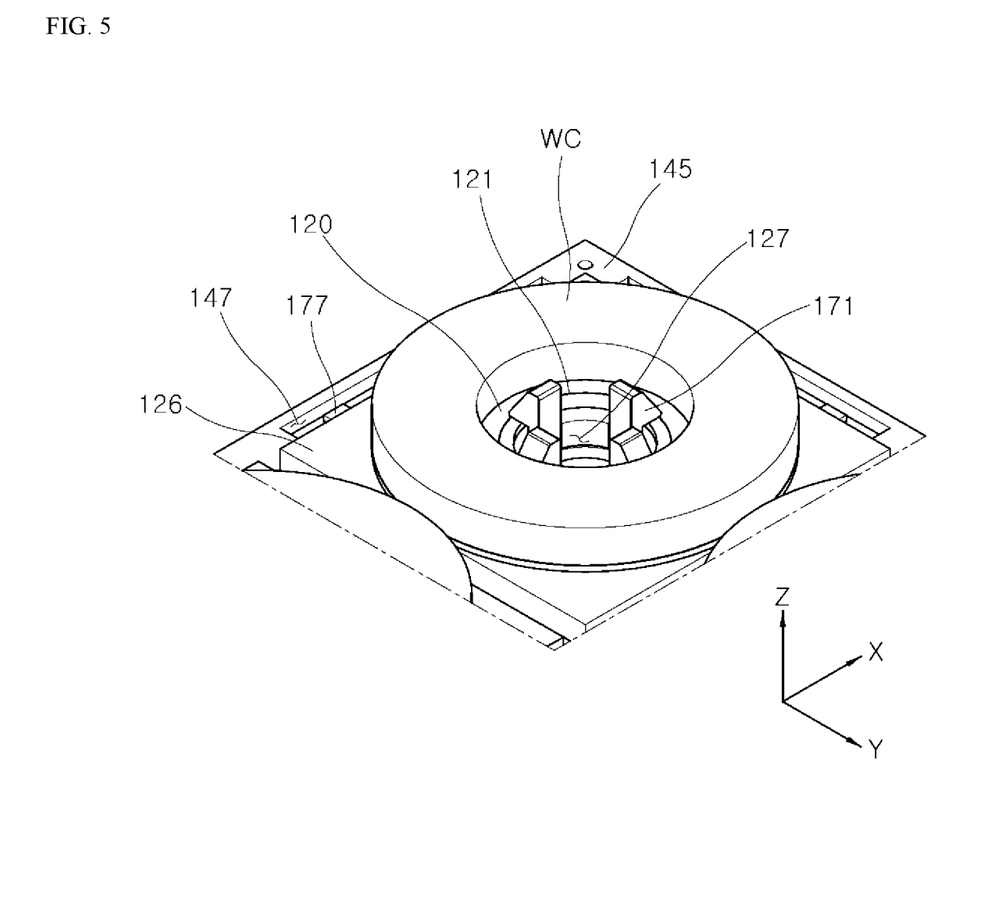
FIG. 5 is an enlarged view illustrating a working coil fixing structure of FIG. 4.
Figure 6:
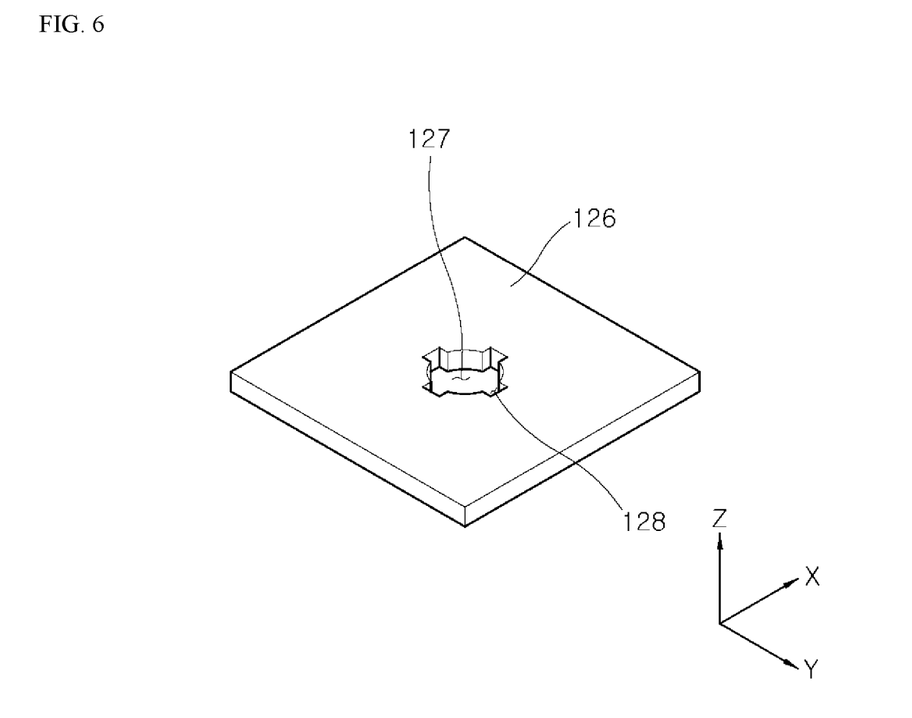
FIG. 6 is a perspective view illustrating a ferrite core of FIG. 5.

FIG. 4 is a schematic diagram illustrating an example induction heating device according to one implementation of the present disclosure. FIG. 5 is an enlarged view illustrating an example working coil fixing structure of FIG. 4. FIG. 6 is a perspective view illustrating an example ferrite core of FIG. 5.

Referring to FIGS. 4 to 6, an induction heating device 1 includes a casing 125, a cover plate 119, a base plate 145, an indicator board support 170, an indicator board 175, and a working coil assembly WCA.

Various components constituting the induction heating device 1, such as the working coil assembly WCA, the base plate 145, the indicator board support 170, and the indicator board 175 may be disposed in the casing 125.

In some implementations, the casing 125 may accommodate various units associated with driving of the working coil WC. An example of the various units associated with driving of the working coil WC may include a power supply that provides AC power, a rectifier for rectifying the AC power of the power supply to DC power, an inverter for converting the DC power rectified by the rectifier to resonant current via switching operation and for supplying the current to the working coil WC, a control unit for controlling operations of various components in the induction heating device 1, and a relay or semiconductor switch that turns the working coil WC on or off. Specific descriptions thereof may be omitted.

In some implementations, the casing 125 may be thermally insulated to reduce heat generated by the working coil WC from leaking to the outside.

The cover plate 119 is coupled to an upper end of the casing 125 to seal the inside of the casing 125. A loaded-object to be heated may be disposed on a top face of the cover plate.

In some examples, the cover plate 119 may include a loading plate 115 for loading an object to be heated such as a cooking vessel thereon.

In some implementations, the loading plate may be made of, for example, a glass material. The loading plate may include an input interface that receives input from a user and transfers the input to the control unit as described above. The present disclosure is not limited thereto. That is, the input interface may be disposed at a position other than a position on the loading plate 15.

In some implementations, the input interface transfers the input provided from the user not to a control unit (that is, a control unit for the inverter) as described above, but to a control unit for the input interface. The input interface control unit may transmit the input to the control unit for the inverter as described above. The details of this will be omitted.

In some implementations, heat generated from the working coil WC may be transferred to the loaded-object through the loading plate 115.

In one example, the working coil assembly WCA may include a working coil WC, a ferrite core 126, and a mica sheet 120 (i.e., a first mica sheet).

In some implementations, when the induction heating device 1 is embodied as a zone-free based induction heating device, a plurality of working coil assembles WCAs may be present as shown in FIG. 4. The plurality of working coil assemblies may be spaced apart from each other by a predetermined distance.

However, for convenience of illustration, a single working coil assembly WCA is illustrated as an example.

In some examples, the working coil WC may include a conductive wire coiled multiple times in an annular shape, and may generate an AC magnetic field. Below the working coil WC, the mica sheet 120 and the ferrite core 126 may be arranged vertically in this order.

In some implementations, a diameter of the working coil WC may be determined based on a size of the loaded-object (e.g., a cooking vessel) to be heated.

The ferrite core 126 is disposed below the working coil WC. A core hole 127 may be defined in a central region of the ferrite core so as to overlap an annular inner face of the working coil WC in a vertical direction (i.e., a Z-axis direction Z).

In some examples, below the ferrite core 126, the base plate 145 may be disposed. The mica sheet 120 may be disposed between the ferrite core 126 and the working coil WC.

In some implementations, as illustrated in FIG. 6, coupling grooves 128 extending in a horizontal direction (that is, an X-axis direction X or Y-axis direction Y) orthogonal to the vertical direction Z may be defined in an outer peripheral face of the core hole 127.

Hooks 171 of the indicator board support 170 as described later may be hooked into the coupling grooves 128 respectively. The coupling grooves 128 may be formed from the core hole 127, for example, in a cross shape or a straight shape.

That is, when the hook 171 is hooked into the coupling groove 128, the ferrite core 126 is fixed to the indicator board support 170. When the hook 171 is separated from the coupling groove 128, the ferrite core 126 is separated from the indicator board support 170. In this way, easy separation between the ferrite core 126 from the indicator board support 170 may be achieved.

In some implementations, a diameter of the core hole 127 may be smaller than or equal to a diameter of a sheet hole 121 formed in a central region of the mica sheet 120, as illustrated in FIG. 5. The diameter of the sheet hole 121 may be smaller than or equal to a diameter of the annular inner face of the working coil WC.

In some implementations, the ferrite core 126 may be fixed to the mica sheet 120 using a sealant. The ferrite core may diffuse the AC magnetic field generated from the working coil WC.

The mica sheet 120 (i.e., the first mica sheet) may be disposed between the working coil WC and the ferrite core 126. The sheet hole 121 (i.e., the first sheet hole) may be defined in a central region of the mica sheet 120 so as to overlap the annular inner face of the working coil WC in the vertical direction Z.

In some examples, the mica sheet 120 may be fixed to the working coil WC and the ferrite core 126 using a sealant. The mica sheet may prevent the heat generated from the working coil WC from being directly transferred to the ferrite core 126.

The diameter of the sheet hole 121 may be greater than or equal to the diameter of the core hole 127 and may be smaller than or equal to the diameter of the annular inner face of the working coil WC.

In some implementations, although not illustrated in the figure, the induction heating device 1 may further include a second mica sheet. The second mica sheet may be fixed to a top face of the working coil WC via a sealant. A second sheet hole may be defined in a central region of the second mica sheet to overlap the annular inner face of the working coil WC in the vertical direction Z.

In some implementations, a diameter of the second sheet hole in the second mica sheet may be the same as the diameter of the first sheet hole 121. The present disclosure is not limited thereto.

The working coil assembly WCA is disposed on the base plate 145.

In some examples, the base plate 145 may be disposed between the ferrite core 126 and the indicator board support 170 to support the working coil WC. A plate hole 146 may be defined in the base plate 145 so as to overlap the annular inner face of the working coil WC in the vertical direction Z.

That is, the base plate 145 may be disposed between the ferrite core 126 and the indicator board 175.

In some implementations, the hooks 171 of the indicator board support 170, which will be described later, may pass through the plate hole 146 and be hooked into the core hole 127, more specifically, the coupling grooves 128). In some implementations, when there are a plurality of working coils WCs, a plurality of plate holes 146 may be provided. Each plate hole 146 may be disposed to vertically overlap the annular inner face of the working coil WC. In this way, the working coil WC may be fixed to the base plate 145 without a separate coil-fixing component.

In some implementations, the base plate 145 may be made of, for example, aluminum Al. The present disclosure is not limited thereto.

In some implementations, a light-emission hole 147 may be defined in the base plate 145 such that a light-emitting element 177 (e.g., LED (Light Emitting Diode)) of the indicator board 175 may be exposed to the outside. That is, the light-emission hole 147 may be formed in the base plate 145 at a position corresponding to a position of the light-emitting element 177.

The indicator board 175 may be disposed between the indicator board support 170 and the base plate 145. A board hole 176 may be defined in the indicator board 175 so as to overlap the annular inner face of the working coil WC in the vertical direction Z.

In some implementations, the hooks 171 of the indicator board support 170, which will be described later, may pass through the board hole 176 and then be hooked into the core hole 127. That is, the hooks 171 of the indicator board support 170 passes through the board hole 176 and, then, through the plate hole 146 and eventually may be hooked into the core hole 127, more specifically, into the coupling grooves 128 respectively. In some implementations, when the number of working coils WC is plural, a plurality of board holes 176 may be provided. Each board hole 176 may be defined to vertically overlap the annular inner face of the working coil WC. In some implementations, the diameters of the board hole 176 and the plate hole 146 may be equal to each other. Each of the diameters of the board hole 176 and the plate hole 146 may be greater than the diameter of the core hole 127 (i.e., excluding a dimension of the coupling groove 128). The present disclosure is not limited thereto.

A plurality of light-emitting elements 177 may be disposed on the indicator board 175. The plurality of light-emitting elements 177 may include LEDs. In some implementations, the plurality of light-emitting elements 177 may be arranged on the indicator board 175 along an outer peripheral face of the ferrite core 126. A plurality of light-emission holes 147 may also be arranged in the base plate 145 along the outer peripheral face of the ferrite core 126.

In some implementations, the indicator board 175 may be implemented, for example, in a form of a printed circuit board (PCB). Whether the working coil WC is driven and the heating intensity (i.e., heating power) may be indicated using the plurality of light-emitting elements 177. In some implementations, although not illustrated in the drawing, the indicator board 175 may further include various components (for example, a working coil sensor, a rectifier) for driving the plurality of light-emitting elements 177.

The indicator board support 170 may be disposed below the ferrite core 126. A hook 171 may protrude from the indicator board support 170. The hook extends in the vertical direction Z and is hooked into the core hole 127.

In some examples, the indicator board support 170 may be disposed below the indicator board 175 to support the indicator board 175. When there are the plurality of working coil WCs, a plurality of hooks 171 of the indicator board support 170 may be provided. Each of the hooks 171 may be disposed to vertically overlap the annular inner face of the working coil WC.

In some implementations, when the coupling grooves 128 defined around the core hole 127 forms a cross shape, four hooks may be formed to correspond to four coupling grooves 128. Alternatively, when the coupling grooves 128 defined around the core hole 127 forms a straight shape, two hooks may be formed to correspond to two coupling grooves 128.

The induction heating device 1 according to one implementation of the present disclosure may also have a wireless power transfer function, based on the configurations and features as described above.

That is, in recent years, a technology for supplying power wirelessly has been developed and applied to many electronic devices. An electronic device with the wireless power transmission technology may charge a battery by simply placing the battery on a charging pad without connecting the battery to a separate charging connector. An electronic device to which such a wireless power transmission is applied does not require a wire cord or a charger, so that portability thereof is improved and a size and weight of the electronic device are reduced compared to the prior art.

In some examples, a wireless power transmission system may include an electromagnetic induction system using a coil, a resonance system using resonance, and a microwave radiation system that converts electrical energy into microwave and transmits the microwave. The electromagnetic induction system may execute wireless power transmission using an electromagnetic induction between a primary coil provided in a unit for transmitting wireless power (for example, a working coil) and a secondary coil included in a unit for receiving the wireless power.

The induction heating device 1 heats the loaded-object via electromagnetic induction. Thus, the operation principle of the induction heating device 1 may be substantially the same as that of the electromagnetic induction-based wireless power transmission system.

In some examples, the induction heating device 1 may have the wireless power transmission function as well as induction heating function. Furthermore, an induction heating mode or a wireless power transfer mode may be controlled by the control unit (or the control unit for the input interface). Thus, if desired, the induction heating function or the wireless power transfer function may be selectively used.

In the induction heating device 1, the working coil WC may be fixed to the base plate 145 without a separate coil-fixing component. This makes it possible to simplify the working coil fixing structure. In some implementations, simplification of the working coil fixing structure (e.g., reduction of the number of components) may lead to material cost reduction and assembly time reduction. Additionally, simplification of the working coil fixing structure may reduce machining cost related to the assembly time.

In some implementations, the induction heating device 1 may allow the components coupling the working coil to be easily replaced. In some examples, the replacement process may to reduce the component failure (for example, uncoiling of the conductive wire of the working coil WC or breakage of the ferrite core 126), which may sometimes occur when the component is replaced.

In the above description, numerous specific details are set forth in order to provide a thorough understanding of the present disclosure. The present disclosure may be practiced without some or all of these specific details. Examples of various implementations have been illustrated and described above. It will be understood that the description herein is not intended to limit the claims to the specific implementations described. On the contrary, it is intended to cover alternatives, modifications, and equivalents as may be included within the spirit and scope of the present disclosure as defined by the appended claims.

What is claimed is:

1. An induction heating device comprising:
   a working coil comprising an annularly-coiled conductive wire, the working coil defining an annular coil hole at a central region of the working coil;
   a ferrite core that is located vertically below the working coil and that defines a core hole at a central region of the ferrite core corresponding to the annular coil hole;
   an indicator board support that is located vertically below the ferrite core, the indicator board support comprising a hook that extends to the core hole in a vertical direction and that is configured to insert into the core hole and couple to the ferrite core;
   a base plate that is located between the ferrite core and the indicator board support, that is configured to support the working coil, and that defines a plate hole at a position corresponding to the annular coil hole; and
   an indicator board that is located between the indicator board support and the base plate and that defines a board hole corresponding to the annular coil hole.

2. The induction heating device of claim 1, wherein the ferrite core further defines a coupling groove that extends outward in a radial direction from a circumferential surface that defines the core hole, and
   wherein the hook is configured to insert into and couple to the coupling groove.

3. The induction heating device of claim 2, wherein a distal end of the hook is configured to be positioned vertically below a top surface of the working coil based on the hook being coupled to the coupling groove, and
   wherein a portion of the hook is configured to protrude toward an annular inner surface of the working coil that defines the annular coil hole based on the hook being coupled to the coupling groove.

4. The induction heating device of claim 2, wherein the core hole is configured to be coaxial with the annular coil hole based on the hook being coupled to the coupling groove.

5. The induction heating device of claim 1, wherein a diameter of the core hole is less than or equal to a diameter of the annular coil hole.

6. The induction heating device of claim 1, further comprising a first mica sheet located between the working coil and the ferrite core, the first mica sheet defining a first sheet hole at a central region of the first mica sheet corresponding to the annular coil hole.

7. The induction heating device of claim 6, wherein the first mica sheet is configured to be coupled to the working coil and to the ferrite core by a sealant.

8. The induction heating device of claim 7, wherein the first sheet hole is configured to be coaxial with the annular coil hole based on the first mica sheet being coupled to the working coil.

9. The induction heating device of claim 6, wherein a diameter of the core hole is less than or equal to a diameter of the first sheet hole, and
   wherein the diameter of the first sheet hole is less than or equal to a diameter of the annular coil hole.

10. The induction heating device of claim 6, further comprising a second mica sheet configured to be coupled to a top surface of the working coil by a sealant,
    wherein the second mica sheet defines a second sheet hole at a central region of the second mica sheet corresponding to the annular coil hole.

11. The induction heating device of claim 10, wherein a diameter of the first sheet hole is equal to a diameter of the second sheet hole.

12. The induction heating device of claim 1, wherein the hook is configured to vertically pass through the board hole and through the plate hole to couple to the core hole.

13. The induction heating device of claim 1, wherein the base plate is made of aluminum (Al).

14. The induction heating device of claim 1, further comprising a plurality of light-emitting elements located on the indicator board.

15. An induction heating device comprising:
    a casing;
    a cover plate that is located at a top of the casing and that is configured to seat one or more objects;
    a plurality of working coils that are located vertically below the cover plate and that are configured to heat the one or more objects on the cover plate, each working coil comprising an annularly-coiled conductive wire and defining an annular coil hole at a central region of a respective working coil;
    a plurality of ferrite cores, each ferrite core being located vertically below a respective one of the plurality of working coils and defining a core hole at a central region of a respective ferrite core corresponding to the annular coil hole of the respective one of the plurality of working coils;
    an indicator board support that is located vertically below the plurality of ferrite cores, the indicator board support comprising a plurality of hooks that each extend to the core hole of a respective one of the plurality of ferrite cores, and that are configured to insert into the core hole of the respective one of the plurality of ferrite cores, and that are configured to couple to the respective one of the plurality of ferrite cores;
    a base plate that is located between the indicator board support and the plurality of ferrite cores and that is configured to support the plurality of working coils, the base plate defining a plurality of plate holes, each plate hole being defined at a position corresponding to the annular coil hole of the respective working coil; and
    an indicator board located between the indicator board support and the base plate, the indicator board defining a plurality of board holes, each board hole being defined at a position corresponding to the annular coil hole of one of the plurality of working coils.

16. The induction heating device of claim 15, wherein the plurality of working coils are arranged horizontally below the cover plate, and have a same thickness with respect to a top surface of each ferrite core.

17. An induction heating device comprising:
a casing;
a cover plate that is located at a top of the casing and that is configured to seat one or more objects;
a plurality of working coils that are located vertically below the cover plate and that are configured to heat the one or more objects on the cover plate, each working coil comprising an annularly-coiled conductive wire and defining an annular coil hole at a central region of a respective working coil;
a plurality of ferrite cores, each ferrite core being located vertically below a respective one of the plurality of working coils and defining a core hole at a central region of a respective ferrite core corresponding to the annular coil hole of the respective one of the plurality of working coils; and
an indicator board support that is located vertically below the plurality of ferrite cores, the indicator board support comprising a plurality of hooks that each extend to the core hole of a respective one of the plurality of ferrite cores, and that are configured to insert into the core hole of the respective one of the plurality of ferrite cores, and that are configured to couple to the respective one of the plurality of ferrite cores,
wherein each ferrite core further defines a coupling groove that extends outward in a radial direction from a circumferential surface that defines the core hole of the respective ferrite core, and
wherein each hook is configured to insert into and couple to the coupling groove of the respective ferrite core.

18. The induction heating device of claim 17, wherein each core hole is configured to be coaxial with the annular coil hole of the respective working coil based on each hook being coupled to the coupling groove of the respective ferrite core.

* * * * *